United States Patent [19]
Jyumonji

[11] Patent Number: 5,987,591
[45] Date of Patent: Nov. 16, 1999

[54] MULTIPLE-SENSOR ROBOT SYSTEM FOR OBTAINING TWO-DIMENSIONAL IMAGE AND THREE-DIMENSIONAL POSITION INFORMATION

[75] Inventor: Takashi Jyumonji, Oshino-mura, Japan

[73] Assignee: Fanuc Limited, Yamanashi, Japan

[21] Appl. No.: 08/894,688

[22] PCT Filed: Dec. 24, 1996

[86] PCT No.: PCT/JP96/03765

§ 371 Date: Nov. 12, 1997

§ 102(e) Date: Nov. 12, 1997

[87] PCT Pub. No.: WO97/24206

PCT Pub. Date: Jul. 10, 1997

[30] Foreign Application Priority Data

Dec. 27, 1995 [JP] Japan ................................ 7/351180

[51] Int. Cl.⁶ .......................... G05B 13/02; G05B 11/32
[52] U.S. Cl. .................................. 712/93; 712/94
[58] Field of Search .................. 395/80, 93, 88; 712/94

[56] References Cited

U.S. PATENT DOCUMENTS 5,570,458  10/1996  Umeno et al. ............................ 395/88
5,748,854   5/1998  Watanabe et al. ....................... 395/93

FOREIGN PATENT DOCUMENTS 58-114892  7/1983  Japan .
4-261789   9/1992  Japan .
7-24585    5/1995  Japan .

Primary Examiner—William Grant
Assistant Examiner—Chad Rapp
Attorney, Agent, or Firm—Staas & Halsey, LLP

[57] ABSTRACT

An image of a workpiece is taken by a CCD camera, which includes a view field covering a supply range of the workpiece, and is transmitted to an image processor to detect the position and posture of the workpiece. A robot controller controls a robot to approach a position from another position based on the result of the detection. Then, a measurement using a laser sensor is started. Scanning laser beams projected from an emitter are detected by a light detector and the detected data are analyzed by the image processor. When the robot reaches a third position, the measurement is terminated. The laser sensor may be of a split-light-projection type. For the approaching movement, the image taken by the camera is displayed on a display device to perform a jogfeed of the robot on the screen.

9 Claims, 12 Drawing Sheets

MULTIPLE-SENSOR ROBOT SYSTEM FOR OBTAINING TWO-DIMENSIONAL IMAGE AND THREE-DIMENSIONAL POSITION INFORMATION

FIELD OF THE INVENTION

The present invention relates a multiple-sensor robot system applicable to various factory automation, and more particularly to a combination of a robot and a multiple-sensor comprising a sensor for obtaining a two-dimensional image and a three-dimensional sensor.

BACKGROUND OF THE RELATED ART

In assembling and machining operations of production lines, it has been a popular practice to detect of a position and a shape of each of various objects using various kinds of sensors. Generally, a sensor for taking a two-dimensional image (e.g., a visual sensor using a CCD camera) is effective in measuring the general position of an object. To the contrary, a laser sensor is effective in measuring a position and a shape of a local part of the object.

The laser sensor is easy to mount on the arm end of a robot and in the case where the output of the laser sensor is fetched into the robot controller, the detailed position and shape of a local part of the object can be measured accurately in real time by projecting a laser beam onto the object from a very nearby position and to use the measured data in correcting the position of the robot.

Accordingly, the robot system having a laser sensor is very popular in the field of an arc-welding robot, a sealing robot and a measuring robot, etc.

The laser sensors are chiefly divided into two types, a spot-light-projecting type and a slit-light-projecting type. In the laser sensor of either type, a spot light beam or slit light beam has to be projected accurately on a surface of the object. As long as the object is positioned in a fixed position with some degree of precision, it is easy to quickly realize such a status that a spot beam or a slit beam is projected on the object, by previously teaching a nearby position of the fixed position, as an approach position to the robot.

However, the object would be positioned often with no precision or less reliable precision, depending on the application. In such event, the object has to be searched using a spot or slit light beam of the laser sensor as a probe while moving the robot along a suitable taught path, and if the work could not found out, it would be impossible to start the main measuring (e.g., the shape measuring) using the laser sensor.

Since the laser sensor is inherently unsuitable for large-area measuring, it would take time to search the object and subsequently to approach to the object. On some occasions reliable searching itself would be difficult. Even if it could be successful in finding the object, this fact might not be useful directly in correcting the robot position. For example, it would not always easy to discriminate a position and a direction (e.g., the position of a start point of welding line and the direction of extension) specified according to the posture of the object, from the laser sensor output obtained for the object in unknown posture.

SUMMARY OF INVENTION

It is an object of this invention to provide a multiple-sensor robot system capable of starting measuring of an object using a three-dimensional-position-measuring sensor such as a laser sensor, by making the robot quickly approach the object, even though the position and posture of the object are unknown.

Another object of the invention is to improve the reliability in performing various operations using a robot and to reduce the cycle time.

According to the present invention, there is provided a multiple-sensor robot system as a combination of a robot and a multiple sensor including first sensing means for obtaining a two-dimensional image within a relatively large area and second sensing means for measuring a three-dimensional position within a relative narrow area by projecting light on the relative narrow area.

The multiple-sensor robot system comprises means for outputting an operation command for the first sensor means, means for outputting an operation command for the second sensor means, means for processing an image signal obtained by the first sensor means, means for processing a measurement output signal of the second sensor means, robot control means for controlling said robot.

It is preferable that the means for processing the image signal obtained by the first sensor means and the means for processing the measurement output signal of the second sensor means are in the form of a shared image processor.

Further, the processing of the image signal obtained by the first sensor means includes processing for determining a position of an object to be measured in the relatively large area, and the robot control means includes means for making the robot perform an approach movement to the object based on the specified position of the object.

Further, the processing of the measurement output signal of the second sensor means includes processing of the measuring output signal outputted after the second sensor means is moved to an approach position by the approach movement.

Typically, the first sensor means is a visual sensor using a camera, and the second sensor means is a laser sensor using a laser spot light or a laser slit light.

In a preferred embodiment, the multiple sensor includes an element shared by the first sensor means and the second sensor means. For example, in the case where the first sensor means is a visual sensor using a camera and the second sensor means is a laser sensor using a laser spot light or a laser slit light, the camera of the visual sensor is used as a light receiving section of the laser sensor.

Preferably, the processing for determining a position of the object from the output signal of the second sensor means includes processing for obtaining an amount of deviation from a reference position of the object, and the approach position is determined as a position which is obtained by correcting a taught approach position according to the obtained amount of deviation.

According to a modified embodiment of the present invention, the multiple-sensor robot system includes image displaying means for displaying the two-dimensional image obtained by the first sensor means, and means for inputting the approach position on the two-dimensional image displayed by the image displaying means. In this embodiment, an operator can designate the approach position on the two-dimensional image displayed by the image displaying means.

According to a feature of the present invention, a multiple sensor in which a disadvantage of the second sensor (e.g., a laser sensor), which has little ability of searching and detecting a position and a posture of the object in a relatively large area is compensated by an ability of the first sensor (e.g., a two-dimensional visual sensor using a CCD camera) is combined with a robot.

Accordingly, even in a case where a detailed position and posture of the object to be measured are unknown, it is possible to reduce the time necessary to start measuring in a relatively small area by the second sensor. Further, by using an image processor which serves as the processing means for processing the image signal obtained by the first sensor means and also the processing means for processing the measurement output signal of the second sensor means, and by sharing an element by the first sensor and the second sensor, it is possible to reduce the number of components of the hardware and the cost of production.

DESCRIPTION OF THE PREFERRED EMBODIMENTS

Figure 1:
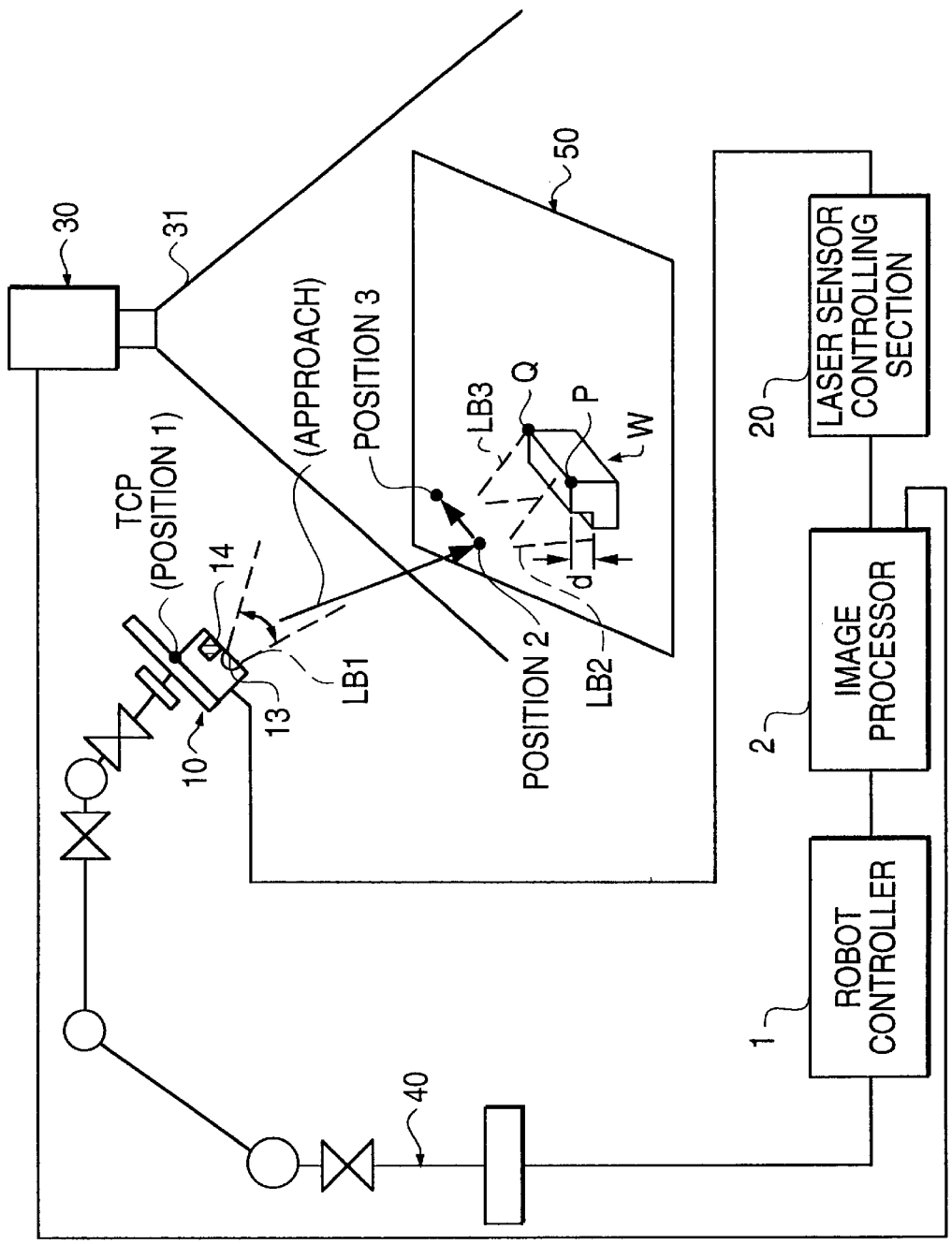
FIG. 1 is a diagram showing a general arrangement of a multiple-sensor robot system according to an embodiment I of the present invention and also illustrating an example of measurement using the robot system.

FIG. 1 is a diagram showing the general arrangement of a multiple-sensor robot system according to a first embodiment (embodiment I) of the present invention and an example of measurement using the system. As an example, the system is applied to an application of measuring steps of a workpiece. A large-area sensor of a multiple sensor detects a workpiece supplied at an uncertain position and in an uncertain posture within a relatively wide range, and a small-area sensor of the multiple sensor measures a step distribution after approaching the workpiece.

As shown in FIG. 1, the whole of the system comprises a robot controller 1, an image processor 2, a laser sensor 10, a laser sensor controlling section 20, a CCD camera 30, and a robot 40. The laser sensor 10 is mounted on an arm end (near a tool center point TCP) of the robot 40, and the CCD camera 30 is disposed outside the robot 40.

The CCD camera 30 constituting the large-area sensor (first sensing means) jointly with the image processor 2 is disposed so that its view field 31 covers a supply area 50, to which a workpiece W is supplied, with a margin.

The laser sensor 10 serving as the small-area sensor (second sensing means) may be either a well-known spot-light projection type or a well-known slit-light-projection type; the former is adopted in this embodiment.

Scanning laser beams LB1, LB2, LB3 are emitted from a laser beam emitting section 13 in accordance with the position of the robot, and the reflected laser beam from the robot is received by a light detecting section 14. The view field of the camera 30 is adequately large, while the scanning range (measuring range) of the laser beam LB1, LB2, LB3 by the laser sensor 10 is considerably small as compared to the range covered by the view field 31 of the camera 30.

The laser sensor 10 is connected to the image processor 2 via the laser sensor controlling section 20. The CCD camera 30 is also connected to the image processor 2. Thus the image processor 2 is shared by the laser sensor (the main section 10 and the controlling section 20) and the CCD camera 30.

The CCD camera 30 takes a photograph when the workpiece W is supplied. A two-dimensional image obtained by the photographing is transmitted to the image processor 2. The image processor 2 analyzes the image to detect the position and posture of the workpiece W. Based on the result of the detection, the robot controller I makes the robot 40 to approach the workpiece W.

In FIG. 1, a position 1 is an approach-starting position, and a position 2 is an approach position. The approach position 2 is a position where it is suitable to start the measuring of the step by projecting the laser beam LB2 on the workpiece W and is determined according to the supply position of the workpiece W.

Practically, the supply position of the individual workpiece W presumably varies in a supply range 50. In this embodiment, the optimum approach position (the approach position to be taught) when the workpiece W is in a suitable reference position is taught to the robot in advance. Deviation of the individual workpiece from the reference position (including the posture) is detected by the CCD camera 30 and the image processor 2, and a calculation for giving the robot a shift (position-and-posture correction) to compensate the deviation with respect to the taught approach position is performed to obtain the approach position 2.

Upon completion of the approaching, the robot 40 continuously measures a step d while moving from the position 2 to a position 3 (measuring-terminating position). The position 3 of a terminal point of a path section starting from the position 2 is taught to the robot in advance, assuming that the workpiece W is located at the reference position. In the actual operation, a measuring-terminating position is calculated in the robot controller 1 as the position 3 by giving a shift (position-and-posture correction) for compensating the deviation of the detected workpiece W with respect to the taught reference position.

Figure 2:
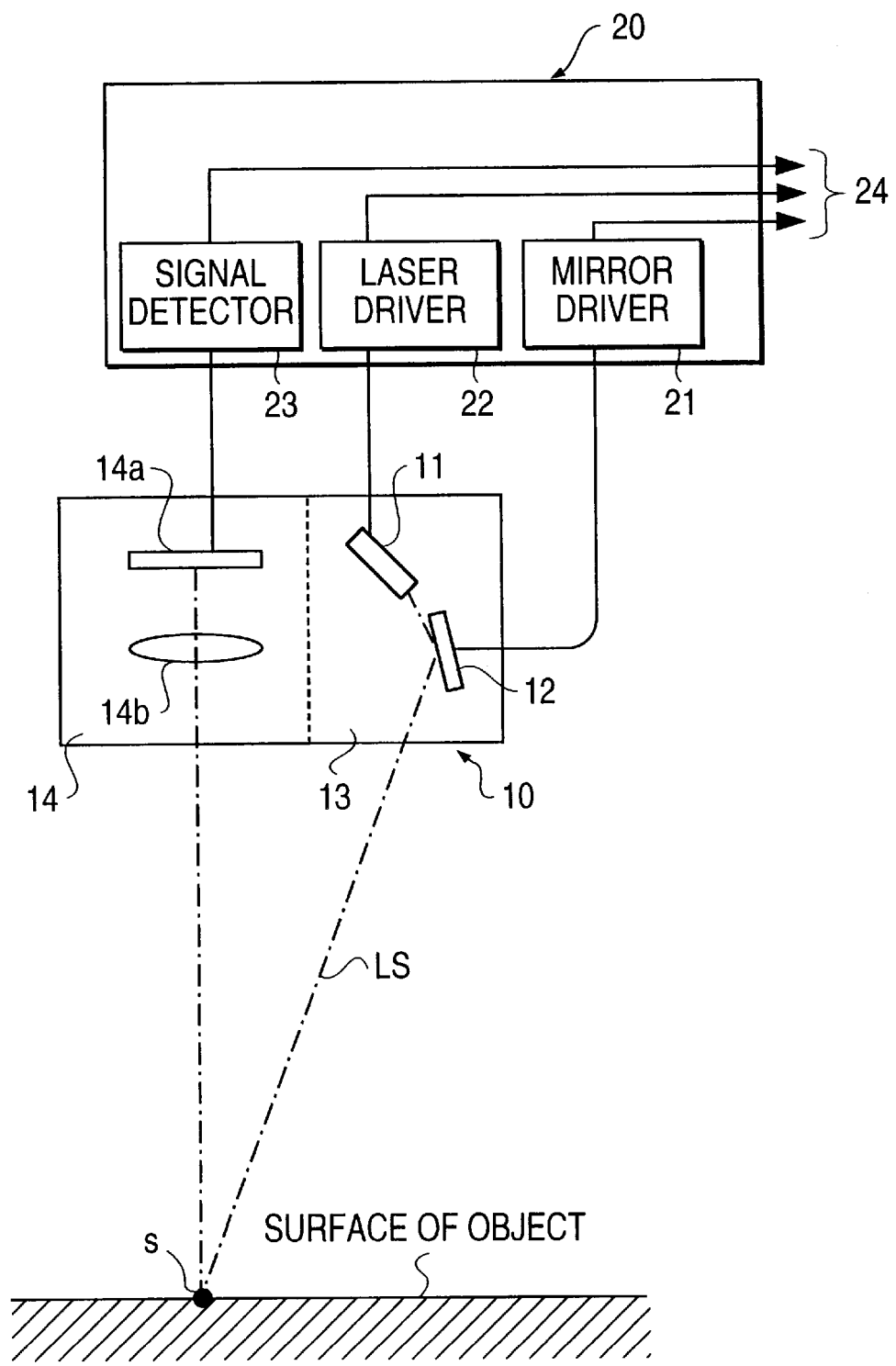
FIG. 2 is a diagram showing a general structure of a laser sensor to be used in the embodiment I.

The structure and the measuring principles of the spot-light-projecting-type laser sensor are well known and are therefore described only in brief here using FIG. 2. The laser beam emitting section 13 of the laser sensor (main section) 10 has a laser oscillator 11 and a pivotal mirror (galvanometer) 12 for scanning the laser beam. The light detecting section 14 has a light receiving element 14a and a focusing optical system 14b.

The laser sensor controlling section 20 is connected with a mirror drive 21 for pivotally moving the pivotal mirror 12, a laser drive 22 for driving the laser oscillator 11 to generate laser beams, and a signal detector 23 for detecting the position from a position at which the laser beam is received by the light receiving element 14a. The mirror drive 21, the laser drive 22 and the signal detector 23 are connected with a laser sensor interface (described below) of the image processor 2 via a circuit 24.

When an operating command for the laser sensor is received from the image processor 2 via the circuit, the laser drive 22 drives the laser oscillator 11 to generate the laser beam LB. In parallel to this, the pivotal mirror 12 is started to pivotally move by the mirror drive 21 so that the laser beam generated from the laser oscillator 11 is scanned on the surfaces of an object.

The laser beam diffused and reflected at a reflecting point S on the surface of the object forms an image on the light receiving element 14a according to the position of the reflecting point S by the optical system 14b. The light receiving element 14a may be CCD or PSD (Position Sensitive Detector), etc.

In this embodiment, a one-dimensional CCD array is used as the light receiving element 14a. The light (the image of the reflected light) struck the light receiving surface of the light receiving element 14a is converted into photoelectrons, and the photoelectrons are stored in cells of the light receiving element 14a. Charges stored in the cells are outputted successively from a terminal end of the array at every predetermined cycle according to a CCD scanning signal from the signal detector 23 and are sent to the image processor 2 via the signal detector 23 and the circuit 24.

The scanning cycle of the CCD is set to adequately shorter (for example, hundredths) than the scanning cycle of the pivotal mirror 12, and the change of angle of pivotal movement of the pivotal mirror 12 and the change of output status of the CCD element can be grasped continuously. The output status of the CCD element is grasped in terms of the maximum-output cell position (cell number), and the cell position at which the reflected light strikes is detected. Based on the detected cell position, the position of the reflecting point S of the laser beam LB is calculated. Software processing for this position detecting is performed in the image processor 2.

Figure 3:
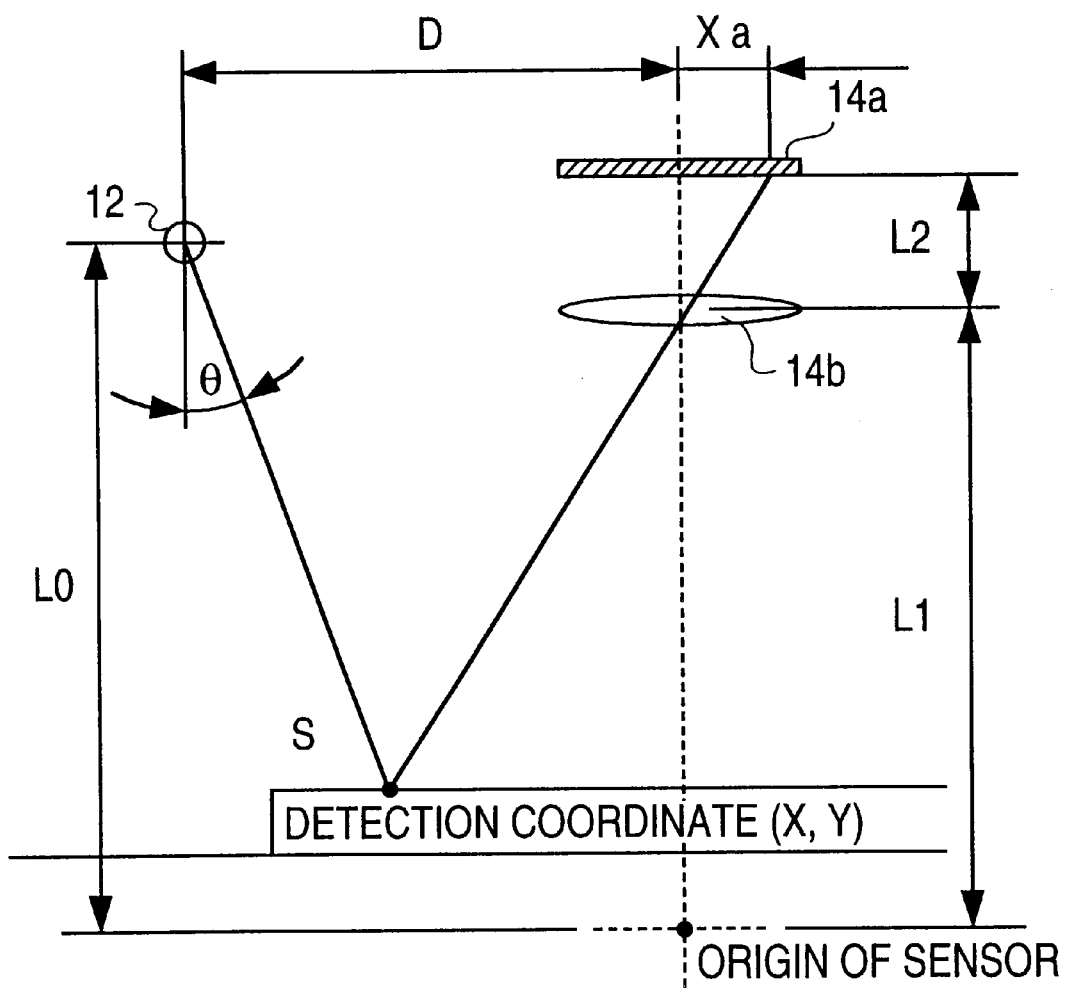
FIG. 3 is a diagram illustrating a method of measuring a three-dimensional position of a spot beam reflecting point by the laser sensor as shown in FIG. 2.

FIG. 3 is a diagram illustrating the manner in which a coordinate position (X, Y) of the reflecting point S of the sensor is obtained based on the position xa detected by the light receiving element 14a. It is assumed that a sensor origin (0, 0) is on a line passing the center of the optical system 14b and the central point of the light receiving element 14a. The line is defined as a Y axis and the axis perpendicular to the Y axis is defined as a X axis.

The coordinate position (X, Y) of the reflecting point S, at which the laser beam LB strikes the object to be reflected, is given by the following equations:

$$X = xa \cdot [(L1-L0)\cdot\tan\theta + D]/(xa + L2\cdot\tan\theta) \quad (1)$$

$$Y = [L1\cdot xa + L2\cdot(L0\cdot\tan\theta - D)]/(xa + L2\cdot\tan\theta) \quad (2)$$

where L1 is a distance from the origin to the center of the optical system, L2 is a distance from the center of the optical system to the central point of the light receiving element 14b, D is a distance from the sensor origin to the center of pivotal movement of the pivotal mirror 12 in the X-axis direction, L0 is a distance on the Y axis from the sensor origin to the center of pivotal movement of the pivotal mirror 12, θ is an angle of the reflected laser beam with respect to the Y axis, and xa is a position, at which the reflected light is received, on the light receiving surface of the light receiving element 14a.

Figure 4:
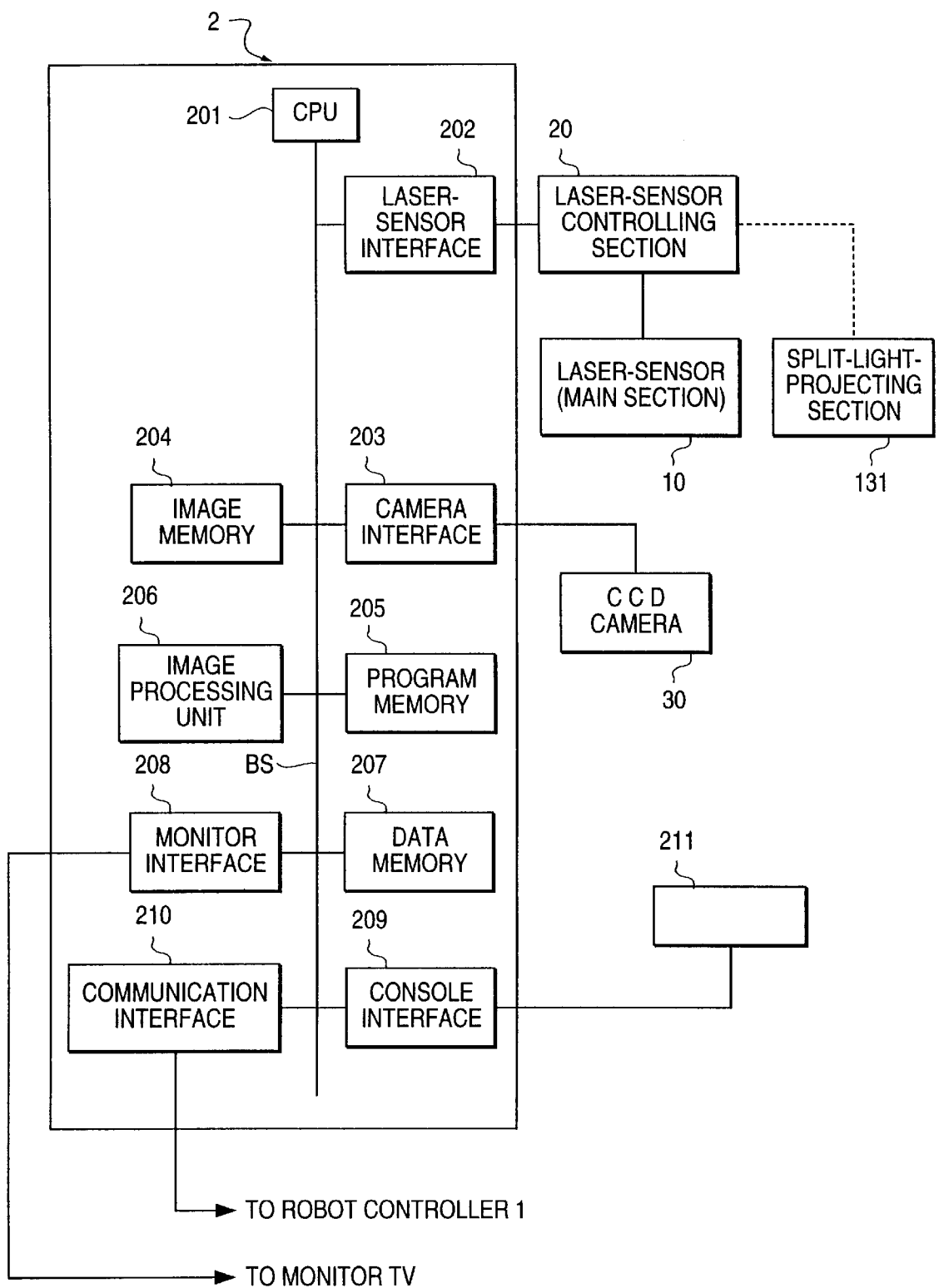
FIG. 4 is a block diagram showing an arrangement of an image processor to be used in the embodiment I and II, and a relationship to associated elements.

The image processor 2 will be described in detail referring to the block diagram of FIG. 4, which shows a hardware architecture of the image processor 2 and a relationship between the hardware architecture of the image processor 2 and its associated elements. As shown in FIG. 4, the image processor 2 has a CPU (Central processing Unit) 201 which is connected via a bus BS with a laser-sensor interface 202, a camera interface 203, an image memory 204, a program memory 205, an image processing device 206, a data memory 207, a monitor interface 208 and a console interface 209.

The laser sensor interface 202 serves as an input-output device for the laser sensor controlling section 20 connected to the main section of the laser sensor 10 and controls the operation of the laser sensor 10 via the mirror drive 21 and the laser drive 22 in the above-mentioned manner. The laser sensor interface 202 converts the detection signals, which are received via the signal detector 23, from analog to digital and stores the digital detection signals in the data memory 207. The data stored in the data memory 207 are used when starting a step calculating program stored in the program memory 205. A slit-light projecting section 131 whose connection is designated by a broken line is used in the case of the slit-light-projecting-type laser sensor and will be described in detail with respect to a second embodiment (embodiment II).

The camera interface 203 serves as an input-output device for the CCD camera 30 and sends, upon receipt of a photographing command from the CPU 201, a photographing signal to the CCD camera 30 and an image taken by photographing is converted into a gray scale and stored in the image memory 204. The stored image is read when starting a position detecting program stored in the program memory 205 and is utilized for an image analysis by the image processing device 206. In this embodiment, the positions of two feature points P, Q of the workpiece W are detected by the image analysis using the image processing device 206.

The monitor interface 208 is connected to a TV monitor. Upon receipt of a monitor image display command from the CPU 201, the current image obtained by the CCD camera 30 or the image stored in the image memory 204 is displayed on the screen of the TV monitor.

A console 211 connected to the console interface 209 is used for outputting various operating commands for the image processor 2 from the CPU 201 by a manual input so as to register, edit and start various programs and set parameters. A communication interface 210 serves to transfer commands and data to the robot controller 1. The robot controller 1 is of an ordinary type which comprises a CPU, a ROM, a RAM, an axis control device, a servo circuit, a communication interface, etc., and therefore description of its architecture and function is omitted here.

Figure 5:
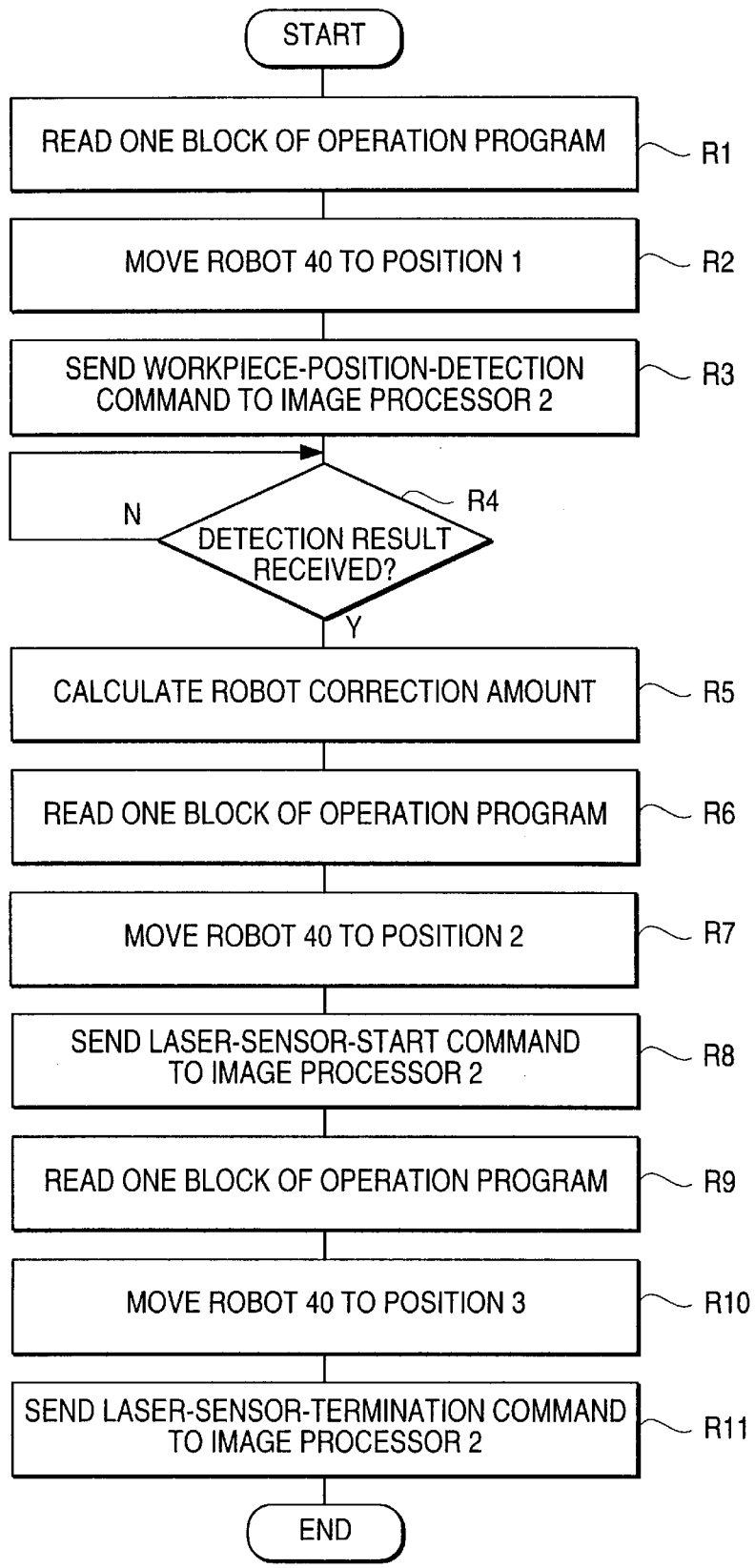
FIG. 5 is a flowchart showing a process to be executed in a robot controller for performing a step distribution measurement with the arrangement as shown in FIG. 1.
Figure 6:
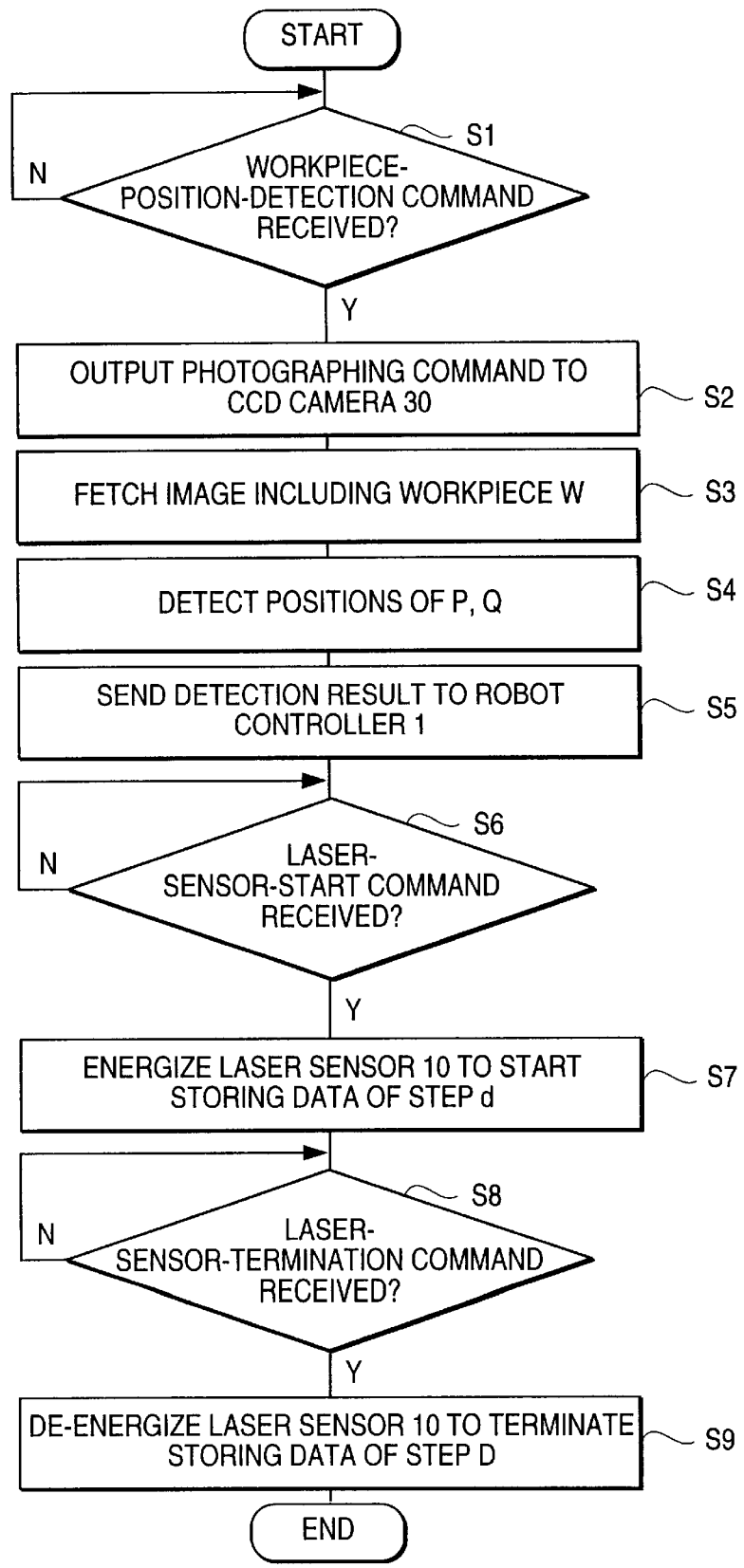
FIG. 6 is a flowchart showing a process to be executed in an image processor for performing the step distribution measurement with the arrangement as shown in FIG. 1.

The general processes to be executed in the robot controller 1 and the image processor 2 for performing the step distribution measuring with the arrangement shown in FIG. 1 will be described referring to the flowcharts of FIG. 5 (the process to be executed in the robot controller 1) and FIG. 6 (the process to be executed in the image processor 2). Calibrations of the laser sensor 10 and the CCD camera 30 are previously completed, and the image data of the reference position of the workpiece W, the approach start position (the position 1), the taught approach position and the position of taught measuring-terminating position are already taught to the robot controller 1.

First, the robot controller 1 reads one block of the operating program describing a command for moving the robot 40 to the position 1 (approach-starting position) (step R1) and executes an ordinary process to move the robot 40 to the position 1 (step R2). The movement is performed in the form of the respective axes movement or the linear movement.

Upon completion of movement to the position 1, the robot controller 1 sends a workpiece-position detection command to the image processor 2 (step R3) and enters the standby status ready to receive the result of detection of the workpiece's positions (the positions of P, Q) (step R4). Upon receipt of sensor data representing the result of detection, the robot controller 1 calculates data representing the deviation of the workpiece W with respect to the reference position on the robot coordinate system and then calculates a necessary amount of correcting the robot position (step R5). The data representing the amount of correcting the robot position may be calculated in terms of data of 4×4 homogeneous translation matrix representing a vector PQ from P to Q and deviation of P with respect to the reference position.

Then, the robot controller 1 reads one block describing a command for moving the robot to the position 2 (approach position) (step R6) and moves the robot 40 to the approach position 2 (step R7). The approach position 2 is a position obtained by shifting the taught approach position by the amount of correction for the robot position, which is obtained with respect to the workpiece W. The movement during approaching is in the form of a respective axes movement or a linear movement.

Upon completion of the approaching, the robot controller 1 sends a laser-sensor-starting command to the image processor 2 (step R8). Then the robot controller 1 reads one block describing a command for moving the robot to the position 3 (measuring-terminating position) (step R9) and moves the robot 40 to the position 3 (step R10). The position 3 is a position obtained by shifting the taught measuring-terminating position by the above-mentioned amount of correction of the robot position. The movement during measuring is in the form of a linear movement in an extending direction of the step of the workpiece 40. When the movement to the position 3 is completed, the robot controller 1 sends a laser-sensor-terminating command (step R11) and terminates the process.

In the meantime, the image processor 2 enters a status ready to receive a workpiece-position-detection command from the robot controller 1 (step S1). Upon receipt of the workpiece-position-detection command, the image processor 2 outputs a photographing command to the CCD camera 30 (step SS2) and fetches an image of the workpiece, W in the view field 31 to store the image in the image memory 204 (step S3).

Then the image processor 2 starts the position detecting program stored in the program memory 205 and reads the stored image data to analyze the image by the image processing device 206 to thereby detect the positions of two feature points P, Q of the workpiece W (step S4)

The image processor 2 sends the result of detection to the robot controller 1 immediately (step S5) and enters a status ready to receive a laser-sensor-starting command from the robot controller 1 (step S6). Upon receipt of the laser-sensor-starting command, the image processor 2 sends a laser-sensor-starting command to the laser sensor controlling section 20, and starts measuring the step of the workpiece to start storing the results of the measuring (step S7). Storing the results of measuring is performed by storing in the data memory 207 all measured data or sampled data obtained by sampling the measured data at an appropriate sampling cycle.

The measurement by the laser sensor 10 is continued until a laser-sensor-terminating command is received, immediately after the robot 40 arrives at the measuring-terminating position 3 (step S8). Upon receipt of the laser-sensor-terminating command from the robot controller 1, the image processor 2 sends to the laser-sensor controlling section 20 the laser-sensor-terminating command to terminate measuring the step of the workpiece and storing the results of this measuring (step S9). Thus, the processes executed in the image processor 2 is completed.

Figure 7:
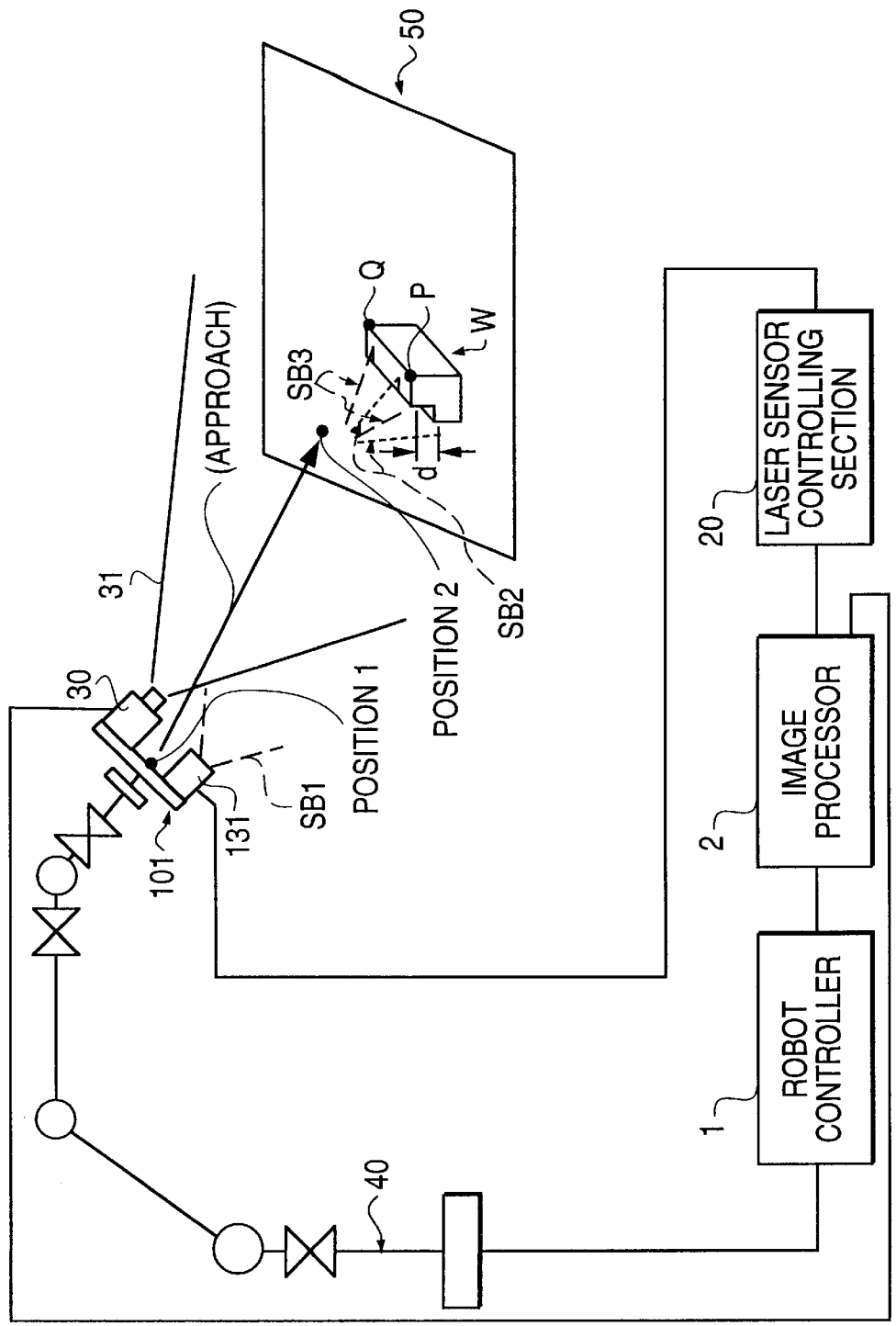
FIG. 7 is a diagram showing a general arrangement of a multiple-sensor robot system according to the embodiment II and an example of measurement using the robot system.

FIG. 7 is a diagram showing a general arrangement of a multiple-sensor robot system according to a second embodiment (embodiment II) and an example of measuring process using the system. The second arrangement (embodiment II) of FIG. 7 is different from the arrangement (embodiment I) of FIG. 1 in the following itemized points:

(1) The laser sensor used is of a slit-light-projection type.

(2) The camera is mounted together with the laser sensor on the arm end of the robot.

(3) The camera serves as a large-area sensor and also as a light-receiving portion of the laser sensor (small-area sensor).

Also in this embodiment, the system is applied to an application of measuring steps of a workpiece. A large-area sensor of a multiple sensor detects a workpiece supplied in an uncertain posture and at an uncertain position within a relatively wide range, and a small-area sensor of the multiple sensor measures a step distribution after approaching the workpiece.

As shown in FIG. 7, the system comprises a robot controller 1, an image processor 2, a slit-light-projecting section 131, a laser sensor controlling section 20, a CCD camera 30, and a robot 40. The slit-light-projecting section 131 and the camera 30 are mounted on an arm end (near a tool center point TCP) of the robot 40, cooperatively constituting a slit-light-projection-type laser sensor 101.

Namely, as described at (3) above, the camera 30 serves as the large-area sensor and also the light-receiving portion of the slit-light-projection-type laser sensor (small-area sensor) 101.

When the camera 30 is used as the large-area sensor (first sensing means) with the image processor 2, it is positioned automatically or manually in an appropriate position at which the field of view 31 of the camera 30 covers a supply area 50 to which the workpiece W is to be supplied.

Laser slit beams SB1, SB2, SB3 are emitted from the slit-light-projecting section 131, and a bright-line image formed on the workpiece W is photographed by the camera 30.

The view field of the camera 30 is set to be adequately large, while the range of projection (measuring range) of the slit-light beams SB1, SB2, SB3 is considerably small as compared to the view field 31 when the camera 30 is used as the large-area sensor.

The slit-light-projecting section 131 of the laser sensor 101 is connected to the image processor 2 via the laser-sensor controlling section 20. The CCD camera 30 is also connected to the image processor 2.

The CCD camera 30 is used first as the large-area sensor when the workpiece W is supplied and takes a photograph of the workpiece W from a relatively far position (pre-approach position). A two-dimensional image obtained by the photographing is sent to the image processor 2. The image processor 2 analyzes the image to detect the position and posture of the workpiece W. Based on the result of the detection, the robot controller 1 makes the robot 40 to approach the workpiece W.

In FIG. 7, a position 1 is an approach-starting position, and a position 2 is an approach position. The approach position 2 is a position suitable to start the measuring of the step of the workpiece W by projecting the laser beam LB2 on the workpiece W, and is determined in accordance with a supply position of the workpiece W.

Practically, the supply position of the individual workpiece W presumably varies in a supply range 50. In this embodiment, the optimum approach position (the approach position to be taught) when the workpiece W is in a suitable reference position is taught to the robot in advance. Deviation of the individual workpiece from the reference position (including the posture) is detected by the CCD camera 30 and the image processor 2, and then a calculation for giving a shift (position-and-posture correction) so as to compensate the deviation with respect to the taught approach position is performed in the robot controller 1, to obtain the approach position 2.

Upon completion of the approaching, the robot 40 continuously measures one or more steps d while moving from the position 2 to a position 3 (not shown).

In the case where the measuring is performed at the position 3, the position 3 is taught to the robot in advance assuming that the workpiece W is located in the reference position. In the actual operation, a measuring-terminating position is calculated in the robot controller 1 as the position 3, by giving a shift (position-and-posture correction) for compensating the deviation of the detected workpiece W from the taught reference position.

Figure 8:
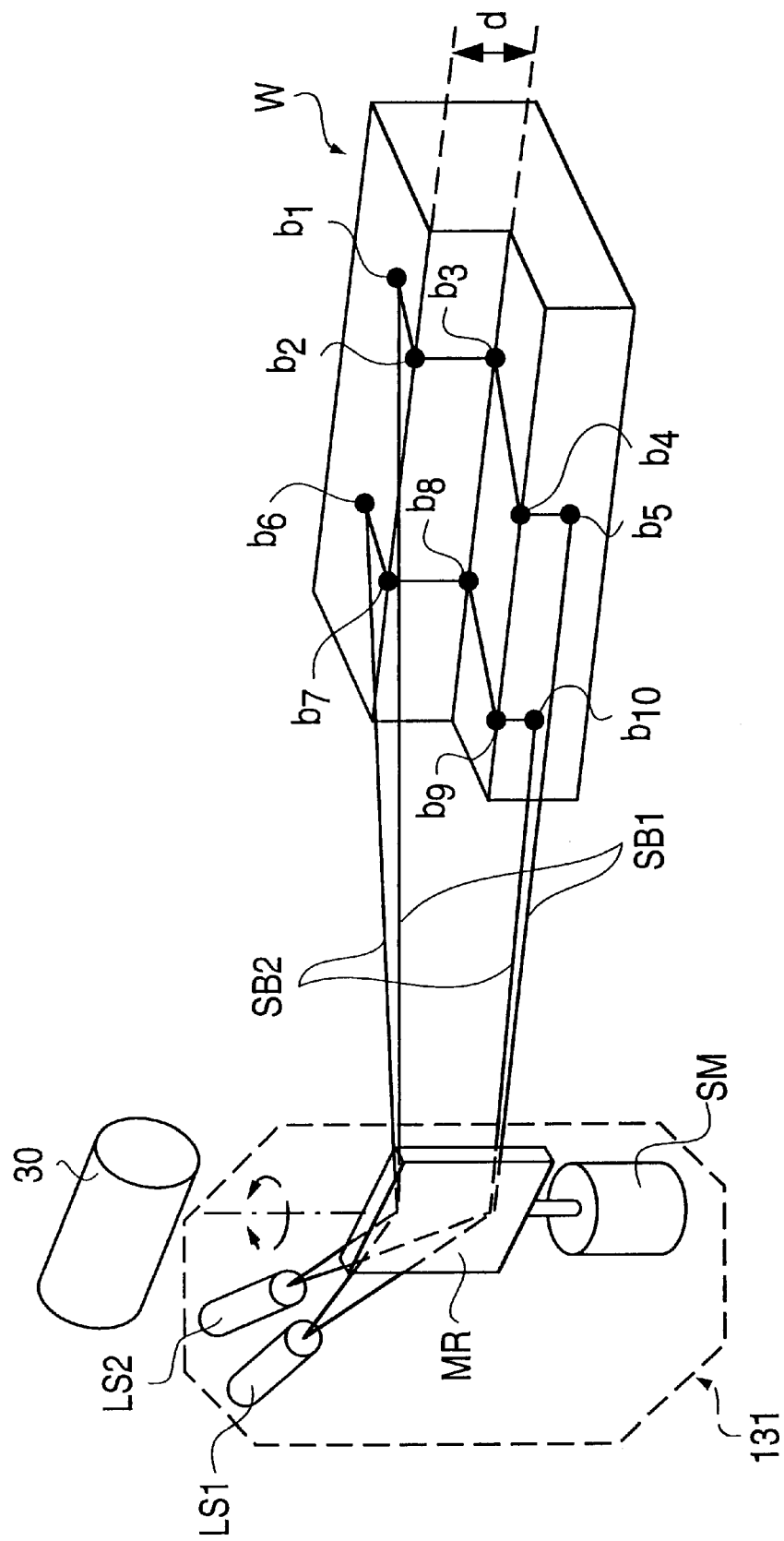
FIG. 8 is a diagram showing a structure and a measuring principle of a split-beam-projection-type laser sensor.

The structure and the measuring principles of the slit-light-projecting-type laser sensor are well known and are therefore described only in brief here using FIG. 8.

The slit-light-projecting section 131 has one or more (two in the this example) laser oscillators LS1, LS2, each with a built-in cylindrical lens, and a deflection mirror MR attached to a galvanometer, which is driven by a stepping motor SM. In the slit-light-projecting section 131, upon receipt of a light emitting command from the image processor 2, the laser oscillators LS1, LS2 emit two laser beams (slit light) made flat by the cylindrical lenses. Each light emitting command includes a position command for the stepping motor SM to control the angle of the deflection mirror MR.

The two laser beams (slit light) are projected on the workpiece (object) W from a light projecting window (not shown) as they are deflected in a predetermined direction by the stepping motor SM according to the values of the position commands. In this embodiment, two slit beams SB1, SB2 are projected on the workpiece (object) W to form two bright lines b1-b5 and b6-b10.

Upon receipt of a photographing command from the image processor 2, the CCD camera 30 takes an image including the bright lines b1–b5 and b6–b10 and sends the image to the image processor 2.

The image processor 2 analyzes the image, which includes the bright lines b1-b5 and b6-b10, to obtain three-dimensional positions, such as end points and bending points b1, b2, . . . , b10, of the bright lines, utilizing its image processing function. The step D is calculated from the three-dimensional position data.

The principles of obtaining three-dimensional positions of bending points and end points, and the method of calibration as well as the details of associated calculation processes are well known, and therefore their description is omitted here.

The hardware architecture of the image processor 2 of the embodiment II and the relationship of the hardware architecture of the image processor 2 to its associated elements are identical with the embodiment II except the laser sensor and its associated elements. Therefore, the following description is focused on the laser sensor and its associated elements to minimize repetitions, referring to FIG. 4 again.

In the embodiment II, the laser sensor interface 202 serves as an input-output device for the laser sensor controlling section 20 connected to the split-light-projecting section 131. The CPU 201 issues operating commands (commands for energizing and de-energizing the laser oscillators LS1, LS2 and a command for rotating the stepping motor SM) to control the slit-light-projecting section 131.

The camera interface 203 serves as an input-output device for the CCD camera 30 and sends, upon receipt of a photographing command from the CPU 201, a photographing signal to the CCD camera 30 and an image taken by photographing is converted into a gray scale and stored in the image memory 204.

The stored image is read when starting a position detecting program stored in the program memory 205 and is utilized in analyzing the image by the image processing device 206. In this embodiment, two different image analyses are performed. When the camera 30 is used as a large-area sensor, no slit beam is emitted and an ordinary image of the workpiece W is obtained. Likewise in the embodiment I, the positions of two feature points P, Q are detected.

When the camera 30 is used as a small-area sensor, slit beams are emitted and an image of bright lines b1-b5, b6-b10 formed on the workpiece W is obtained so that three-dimensional positions of the end points/bending points b1-b5, b6-10b contained in the image are detected (FIG. 8).

In this embodiment, like the embodiment I, the robot controller 1 is of an ordinary type comprising a CPU, a ROM, a RAM, an axis control device, a servo circuit, a communication interface, etc., and therefore its detailed description is omitted here.

Figure 9:
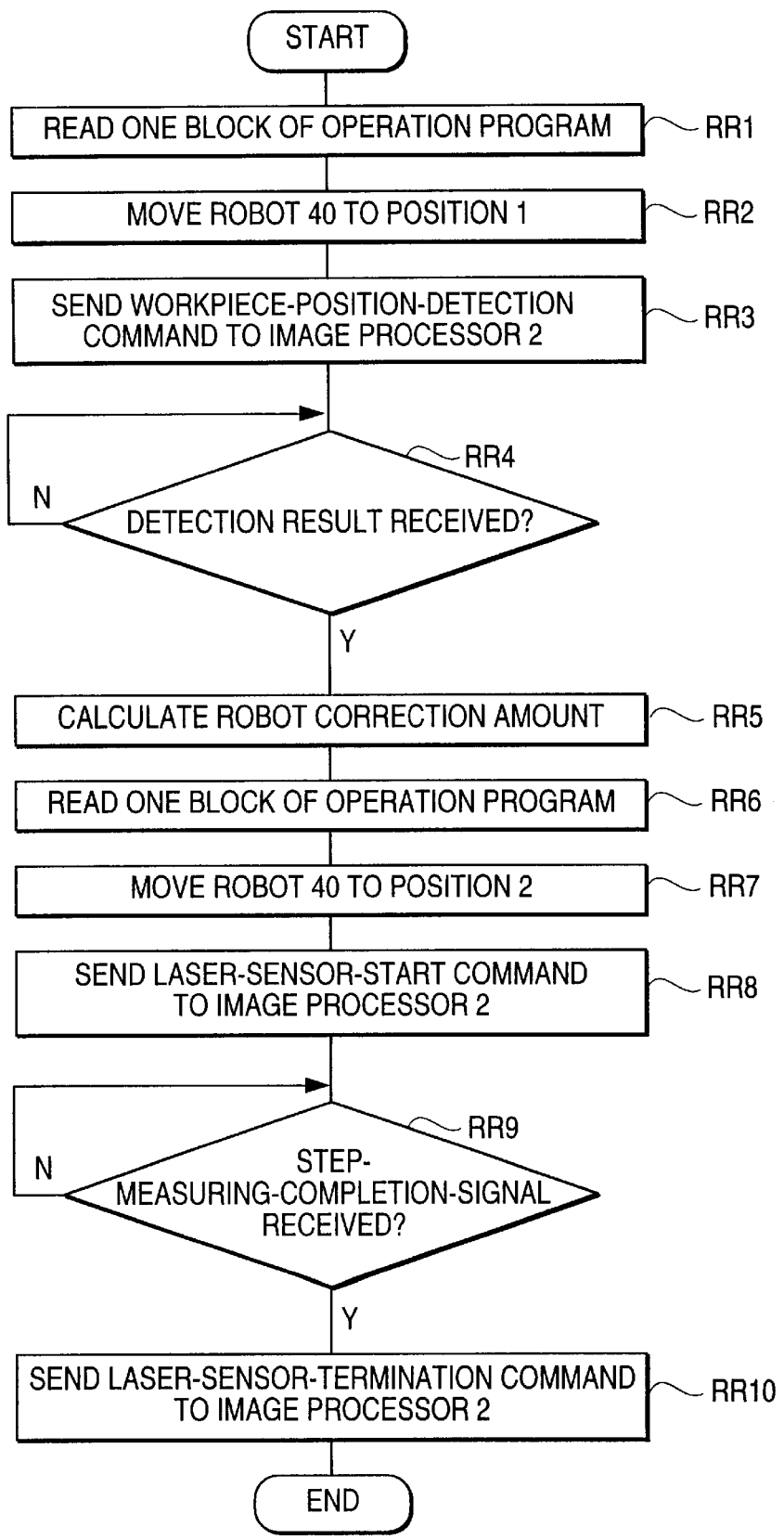
FIG. 9 is a flowchart showing a process to be executed in a robot controller for performing a step distribution measurement with the arrangement as shown in FIG. 7.
Figure 10:
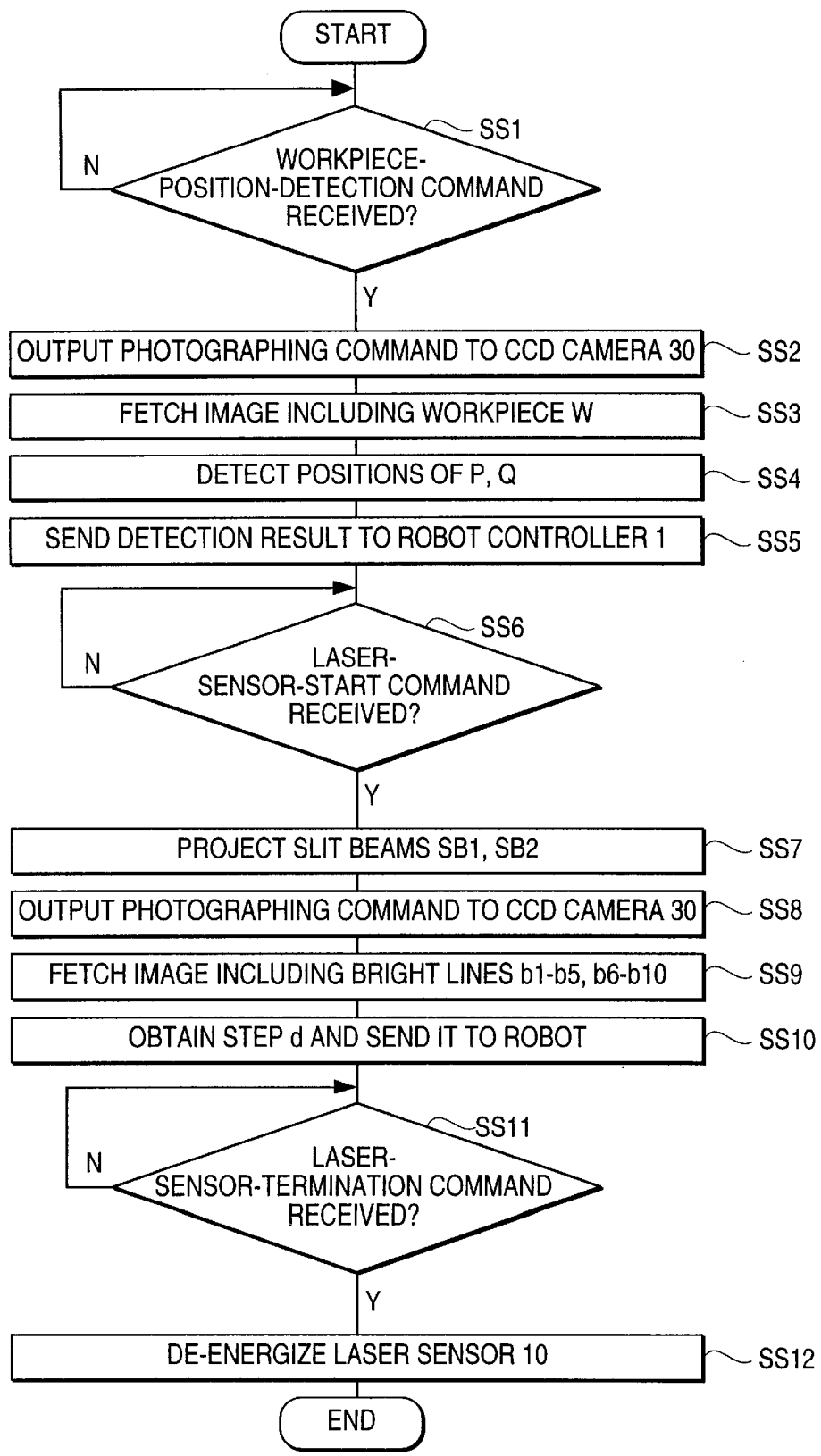
FIG. 10 is a flowchart illustrating a process to be executed in an image processor for performing the step distribution measurement with the arrangement as shown in FIG. 7.

The general processes to be executed in the robot controller 1 and the image processor 2 for performing the step distribution measuring with the arrangement of FIG. 7 will be described referring to the flowcharts of FIG. 9 (the processing in the robot controller 1) and FIG. 10 (the processing in the image processor 2).

Calibrations of the laser sensor 10 and the CCD camera 30 are previously completed, and the image data of the reference position of the workpiece W, the approach start position (the position 1), the taught approach position and the position of taught measuring-terminating position are already taught to the robot controller 1.

In the following description, slit light is projected only at the approach position (position 2), and the robot does not move for measuring the steps of the robot. In the slit-light-projecting-type laser sensor, the slit light can be emitted in a certain range of angle by swinging the deflection mirror MR.

First, the robot controller 1 reads one block of the operating program describing a command for moving the robot 40 to the position 1 (approach-starting position) (step RR1) and executes an ordinary process to move the robot 40 to the position 1 (step RR2). The movement is in the form of a respective axes movement or a linear movement.

Upon completion of movement to the position 1, the robot controller 1 sends a workpiece-position detection command to the image processor 2 (step RR3) and enters a standby status ready to receive the result of detection of the workpiece's positions (the positions of P, Q) (step RR4). Upon receipt of sensor data representing the result of detection, the robot controller 1 calculates data representing the deviation of the workpiece W from the reference position on the robot coordinate system and then calculates a necessary amount for correcting the robot position (step RR5). The data representing the amount for correcting the robot position may be calculated in terms of data of 4×4 homogeneous translation matrix representing the vector PQ from P to Q and a deviation of P from the reference position.

Then, the robot controller 1 reads one block describing a command for moving the robot to the position 2 (approach position) (step RR6) and moves the robot 40 to the approach position 2 (step RR7). The approach position 2 is a position obtained by shifting the taught approach position by the amount of correction of the robot position, which is obtained with respect to the workpiece W. The movement in approaching is in the form of a respective axes movement or a linear movement.

Upon completion of the approaching, the robot controller 1 sends a laser-sensor-starting command to the image processor 2 (step RR8). Then, the robot controller 1 waits (step RR9) for a signal from the image processor 2 that the measuring of the robot step has been completed. Upon receipt of such signal, the robot controller 1 sends a laser-sensor-terminating command to the image processor 2, to terminate the measuring process.

In the meantime, the image processor 2 first enters a status ready to receive a workpiece-position-detection command from the robot controller 1 (step SS1). Upon receipt of the workpiece-position-detection command, the image processor 2 outputs a photographing command to the CCD camera 30 (step SS2) and fetches an image of the workpiece W in the view field 31, to store the image in the image memory 204 (step SS3). Then, the image processor 2 starts the position detecting program stored in the program memory 205 and reads the stored image data to analyze the image by 205 and reads the stored image data to analyze the image by the image processing device 206, to thereby detect the positions of two feature points P, Q of the workpiece W (step SS4).

The image processor 2 immediately sends the result of detection to the robot controller 1 (step SS5) and enters a status ready to receive a laser-sensor-starting command from the robot controller 1 (step SS6). Upon receipt of the laser-sensor-starting command, the image processor 2 sends a laser-sensor-starting command to the laser sensor controlling section 20, and start measuring the step of the workpiece to start storing the results of this measuring (step SS7).

Then the image processor 2 outputs a photographing command to the CCD camera (step SS8) and fetches into the image processor 2 the image of the bright lines b1-b5, b6-b10, which are formed on the workpiece W, to store the image data in the image memory 204 (step SS9).

Various calculation methods are known for obtaining a step from the three-dimensions positions of the end points/ bending points b1, b2, ... , b10. For example, in FIG. 8, a straight line b1b6 is obtained from the bending points b1, b6 and likewise a straight line b3b8 is obtained from the bending points b3, b8, whereupon a step d can be obtained from the distance between the two straight lines. In this method, since three-dimensional positions can be obtained on the sensor coordinate system, it is unnecessary to perform a coordinate conversion processing between the sensor coordinate system and the robot coordinate system and to consider the robot posture.

For improving the measuring accuracy, it is preferable that the image processor 2 sends robot-moving commands to the stepping motor SM and repeats steps SS7–SS9 under various conditions in which the direction of emission of slit light are changed, to obtain the step d.

Upon receipt of the laser-sensor-terminating command from the robot controller 1 (step SS11), the image processor 2 de-energizes the laser sensor (the slit-light-projecting means 131) (step SS12), to terminate the measuring process.

In the foregoing embodiments I and II, an image obtained by the camera 30 as a large-area sensor is analyzed by the image processor so that the robot 40 takes an automatic approach. The approach position is determined by correcting a previously taught approach position based on deviation data obtained by the image analysis.

Figure 11:
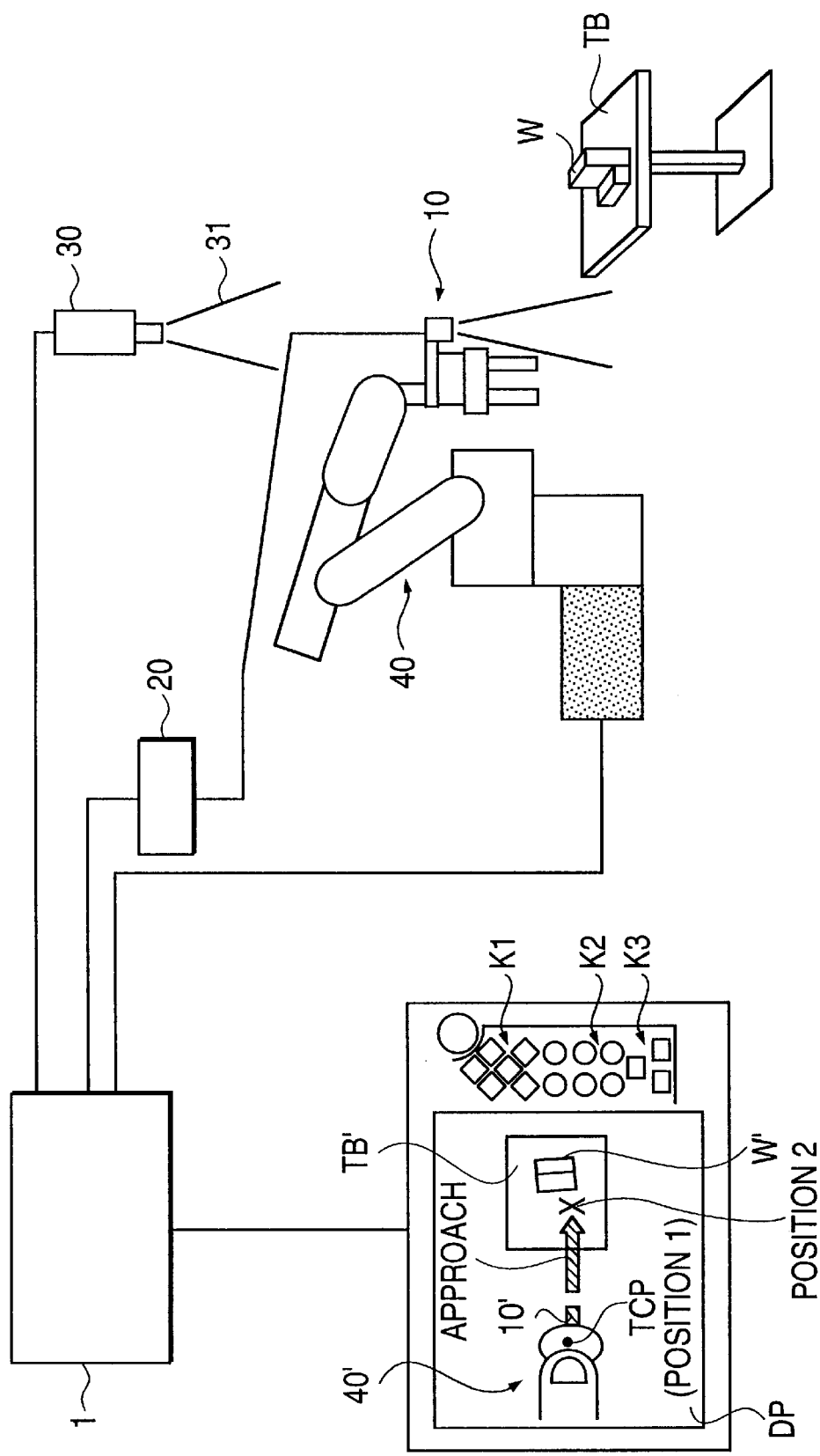
FIG. 11 is a diagram showing a general arrangement of a multiple-sensor robot system according to an embodiment III and an example of measurement using the robot system.

In an embodiment III described below, an image obtained by the camera 30 as the large-area sensor is displayed on the screen of the display device, and a jog-feed on the display screen is incorporated in approach movement of the robot. The general arrangement of the system is shown in FIG. 11. In this embodiment, like the embodiments I and II, the system is applied to a measurement of a step of the workpiece.

As shown in FIG. 11, the system comprises a robot controller 1, a laser sensor (spot-light-projection type or slit-light-projection type) 10, a laser-sensor controlling section 20, a CCD camera 30, a robot 40 and a teaching control panel TP with a display DP.

The laser sensor 10 is mounted on an arm end (near a tool center point TCP) of the robot 40, and the CCD camera 30 is disposed outside the robot 40.

The CCD camera 30 serving as a large-area sensor is disposed over a table TB and the robot 40 so that a field of view 31 covers the table TB having an area equivalent to a workpiece supply area, and a robot approach area. An optical axis of the camera 30 extends vertically downwardly (in the direction of Z axis of a robot coordinate system).

The arrangement and function of the laser sensor (spot-light-projection type or slit-light-projection type) serving as a small-area sensor (second sensing means) are already described with respect to the embodiments I, II, and hence repetition of their description is omitted here.

The robot controller 1 is of a well-known type having a built-in image processor and has functions of issuing a photographing command to the camera 30 to obtain an image, displaying the image on the display DP and calculating a position (X, Y) on the robot coordinate system with respect to a position designated on the screen by a cursor or the like. Based on output signals of the laser sensor 10 which are received via the controlling section 20, the step measuring process is performed in the above-mentioned manner.

The teaching control panel TP with operating key or button groups K1, K2, K3 has a function to designate a jog-movement target position on the display screen, as well as a function of an ordinary teaching operation panel.

For example, the group K1, K2 are used in an ordinary jog-feeding in XYZ directions, about XYZ axes and about the robot axis, while the group K3 is used as a cursor key group for moving the cursor (not shown) in the XY direction on the display screen.

A camera 30 can cover at least the arm end of the robot 40 in the standby position and the table TB in the view field. Therefore, images of the robot 40 in the pre-approach position (position 1), the laser sensor 10 (rear side) and the workpiece W are displayed as images 40', 10', W'.

When an operator watching the screen operates the cursor key of the group K3 to position a non-illustrated cursor at a position appropriate as the approach position 2 and makes a confirming operation (e.g., depressing a single key of the group K3), the cursor position is transmitted to the robot controller 1, so that an XY position (on the robot coordinate system) represented by the cursor position is obtained.

Further, when the operator makes an approach starting operation (e.g., consecutively depressing a single key of the group K3 twice), the robot 40 moves to the obtained XY position. The robot 40 may be moved to an appropriate Z position after moving in the XY directions, but it is preferable that the Z-axis jogging is commanded by an appropriate operation (e.g., depressing a single key of the group K1) during the jog-advancing on the screen.

Figure 12:
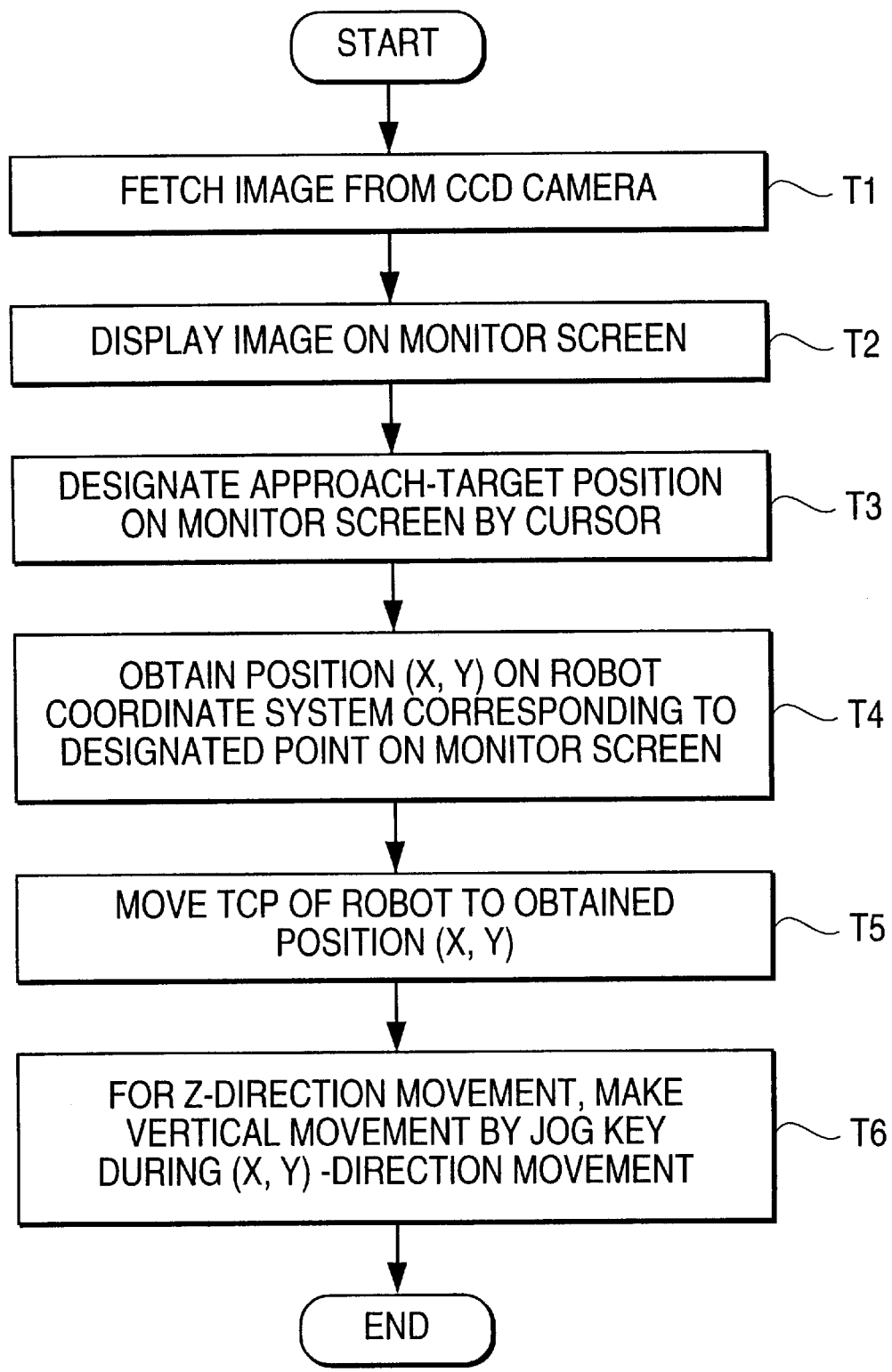
FIG. 12 is a flowchart showing a process of an approaching movement to be executed in a robot controller for performing a step distribution measurement with the arrangement as shown in FIG. 11.

The general process to be executed in the robot controller 1 is shown in the flowchart of FIG. 12. This embodiment is characterized in the approach movement and is similar to the embodiment I or II in measuring the step of the workpiece W by the laser sensor (usually, a three-dimensional-position sensor) after completion of the approaching. Therefore, the process until completion of the approaching will be described.

A photographing command is sent to the CCD camera 30 to fetch an image including images of the robot arm end and the workpiece (step T1). Then, the images 40', 10', W' are displayed on the screen of the monitor (i.e., the display DP associated with the teaching control panel TP) (step T2).

According to a cursor key operation by the operator, the approach position 2 is designated by positioning the cursor at a desired approach position on the screen (step T3). Subsequently, the position designated by the cursor is converted into a position (X, Y) on the robot coordinate system (step T4).

Further, upon receipt of an approach-starting operation, the robot controller 1 renders the tool center point TCP of the robot 40 to move to the designated position 2 (X, Y). Regarding the Z position, the position of the robot 40 is adjusted by measuring the vertical distance between the laser sensor 10 and the workpiece W by naked eyes. For this purpose, upon receipt of a Z-axis jogging command in jog-advancing on the screen, the robot controller 1 creates a command for instructing a Z-axis movement and transfers the command to a servo system to move the tool center point TCP of the robot 40 in the Z-axis direction (step T). The approach movement is thus completed. Further, if it is necessary, the robot posture is adjusted at the end of the process. Regarding the robot posture about the Z axis, it is possible to designate the approach position 2 to include a designated posture about the Z axis by giving the cursor a posture designating function.

In the foregoing embodiments, a multiple sensor is combined with a measuring robot for measuring the step. The multiple sensor may be combined with an alternative robot for use in another application.

According to the present invention, the disadvantage of a small-area sensor such as a laser sensor is compensated by a large-area sensor such as a CCD camera for taking a two-dimensional image. Accordingly, even in an application in which the detail position and posture of an object to be measured, it is possible to make the robot approach the object quickly and accurately to start the measuring process by the small-area sensor.

As a result, it is possible to reduce the cycle time in various applications. Further, by sharing an image processor, light detecting means, etc. in the system, it is possible to simplified hardware and to reduce the cost of production.

I claim:

1. A multiple-sensor robot system comprising:
a robot;
a multiple sensor comprising:
first sensing means for obtaining a two-dimensional image within a relatively large area, and
second sensing means for measuring a three-dimensional position within a relative small area by projecting light on the relative small area;
means for outputting an operation command for said first sensor means;
means for outputting an operation command for said second sensor means;
means for processing an image signal obtained by said first sensor means;
means for processing a measurement output signal of said second sensor means;
robot control means for controlling said robot;
wherein said processing of said image signal from said first sensor means includes processing for determining a position of an object to be measured in said relatively large area;
said robot control means includes means for making said robot perform an approach movement to said object based on said determined position of said object; and
said processing of said measurement output signal from said second sensor means includes processing of said measuring output signal outputted after said second sensor means is moved to an approach position by said approach movement.

2. A multiple-sensor robot system according to claim 1, comprising an image processor which serves as said image signal processing means and also said measuring output signal processing means.

3. A multiple-sensor robot system according to claim 1, wherein said first sensor means comprises a visual sensor using a camera.

4. A multiple-sensor robot system according to claim 1, wherein said second sensor means comprises a laser sensor using a laser spot light or a laser slit light.

5. A multiple-sensor robot system according to claim 1, wherein said multiple sensor includes an element shared by said first sensor means and said second sensor means.

6. A multiple-sensor robot system according to claim 1, wherein said first sensor means comprises a visual sensor using a camera, and said second sensor means comprises a laser sensor using a laser spot light or a laser slit light, and said camera of said visual sensor is used as a light receiving section of said laser sensor.

7. A multiple-sensor robot system according to claim 1, wherein said processing for determining a position of the object to be measured includes processing for obtaining an amount of deviation from a reference position of said object, and
said approach position is determined as a position which is obtained by correcting a taught approach position according to said obtained amount of deviation.

8. A multiple-sensor robot system according to claim 1, further including image displaying means for displaying said two-dimensional image obtained by said first sensor means, and means for inputting said approach position on said two-dimensional image displayed by said image displaying means.

9. A multiple-sensor robot system comprising:
a robot; and
a multiple sensor comprising:
first sensing means for obtaining a two-dimensional image within a relatively large area, and second sensing means for measuring a three-dimensional position within a relative small area by projecting light on the relative small area, wherein said first sensor means comprises a visual sensor using a camera, and said second sensor means comprises a laser sensor using a laser spot light or a laser slit light, and said camera of said visual sensor is used as a light receiving section of said laser sensor.

* * * * *